Nov. 22, 1966  T. E. DRAPLIN ETAL  3,286,389
VEHICLE BODY
Filed Aug. 20, 1964
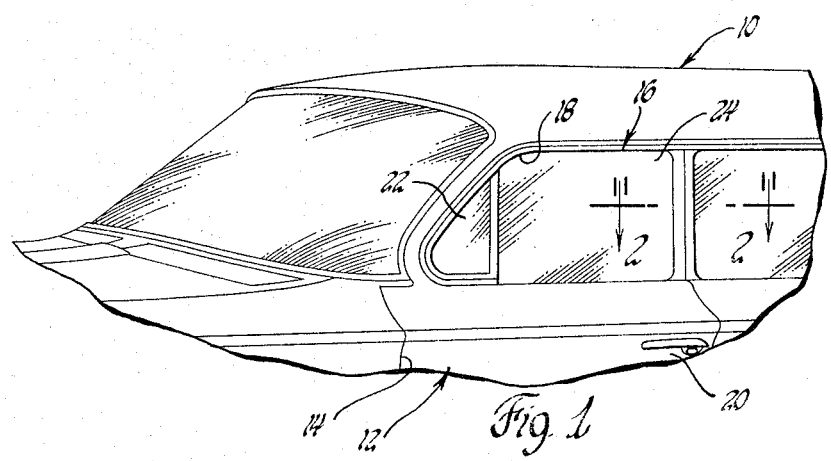
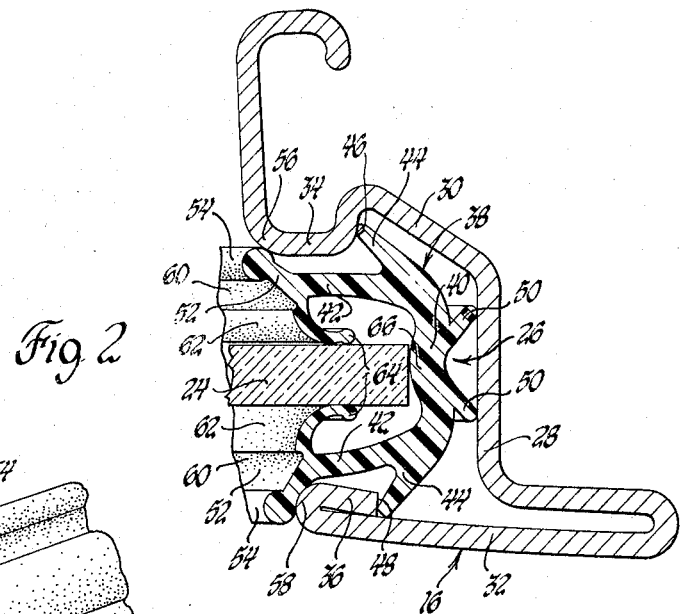
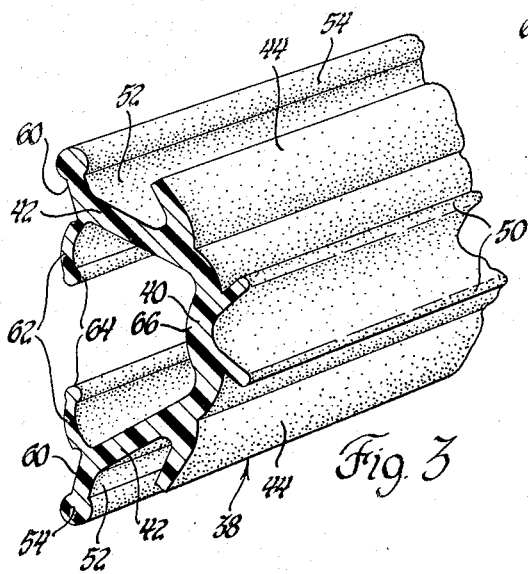
INVENTORS
Thomas E. Draplin &
BY Walter Wenger
Herbert Furman
ATTORNEY

United States Patent Office 3,286,389
Patented Nov. 22, 1966

3,286,389
VEHICLE BODY
Thomas E. Draplin, Southfield, and Walter Wenger, Rochester, Mich., assignors to General Motors Corporation, Detroit, Mich., a corporation of Delaware
Filed Aug. 20, 1964, Ser. No. 390,875
3 Claims. (Cl. 49—441)

This invention relates to vehicle bodies and more particularly to a vehicle body door structure.

One feature of this invention is that the door structure includes a window frame member and a weatherstrip self-retained within the frame member by cooperating means on both the frame member and weatherstrip. Another feature of this invention is that the frame member is provided with weatherstrip retaining ribs which are engageable by deflectable ribs on the weatherstrip to retain the weatherstrip in place. A further feature of this invention is that the weatherstrip ribs are provided on the side walls thereof and the base wall of the weatherstrip is provided with deflectable ribs engageable with the frame member to bias the weatherstrip ribs into engagement with the retaining ribs. Still another feature of this invention is that the side walls of the weatherstrip include deflectable guide ribs which extend inwardly therefrom and oppositely to the first weatherstrip ribs to engage a panel slidably received within the weatherstrip. Still a further feature of this invention is that the side walls of the weatherstrip include third deflectable ribs which extend therefrom in the same direction as the first deflectable ribs and in spaced relationship thereto to provide longitudinal pockets receiving the frame member retaining ribs and concealing such ribs.

These and other features of the door structure of this invention will be readily apparent from the following specification and drawings wherein:

FIGURE 1 is a partial perspective view of a vehicle body embodying a door structure according to this invention;

FIGURE 2 is an enlarged sectional view taken generally along the plane indicated by line 2—2 of FIGURE 1; and FIGURE 3 is a perspective view of the weatherstrip.

Referring now particularly to FIGURE 1 of the drawings, a vehicle body designated generally 10 includes a front door 12 which is hinged to the body adjacent its forward edge 14 for movement between a closed position as shown and an open position not shown. The door 12 includes an upper door window frame member 16 which defines a window opening 18 with the lower portion 20 of the door. The forward portion of the opening 18 is opened and closed by a conventional CV or ventilation window 22 and the rear portion of the window opening 18 is opened and closed by a vertically movable door window 24.

The frame member 16 is substantially the same as that shown and described in Wernig 2,941,838, and reference may be had thereto for a full description of the details of this frame member.

Generally, the frame member 16 includes an outwardly opening channel portion 26 having a base wall 28 and a pair of side walls 30 and 32. The side wall 30 includes a laterally inwardly extending weatherstrip retaining rib 34 and the side wall 32 includes a return bent portion providing a weatherstrip retaining rib 36. A weatherstrip designated generally 38 is received within the channel portion 26 to provide both a seal and a guide for the window 24 during movement of the window between its open and closed positions. The weatherstrip 38 is of generally channel cross section and includes a base wall 40 and a like pair of side walls 42. The side walls 42 are each provided with an outwardly extending deflectable rib 44, the terminal edges of which are engageable with shoulders 46 and 48 of the retaining ribs 34 and 36, respectively, in order to retain the weatherstrip 38 within the frame member. The base wall 40 of the weatherstrip further includes an oppositely extending pair of deflectable ribs 50 which are slidably engageable with the base wall 28 of the channel portion 26 in order to bias the ribs 44 into engagement with the shoulders 46 and 48 of the retaining ribs of the frame member.

The side walls 42 of the weatherstrip each further includes a laterally and outwardly extending deflectable rib 52, located generally parallel to a respective rib 44 and terminating in a beaded edge 54. The beaded edges 54 of the ribs 52 slidably engage shoulders 56 and 58 of the ribs 34 and 36, respectively, and further cooperate with a respective rib 44 in providing a housing for the weatherstrip retaining ribs of the frame member 16. Although not shown in the drawings, it is intended that the beaded edges 54 and the outer surfaces 60 of the ribs 52 be provided with a decorative coating or covering, such as Mylar, in order to add to the appearance of the weatherstrip.

The side walls 42 of the weatherstrip also include laterally and inwardly extending thin deflectable ribs 62, each of which extends generally opposite to a rib 52 and terminates in a beaded edge 64 which is generally smaller than the beaded edge 54 of ribs 52. It is intended that the beaded edges 64 and possibly an adjacent portion of each of the ribs 62 slidably engage the opposite surfaces of the window 24 to not only seal the window but provide a guiding means therefor upon movement of the window between its open and closed position.

It will further be noted that the base wall 40 of the weatherstrip 38 includes a generally arcuately shaped, inwardly extending portion 66 which is intended to engage the edge of the window 24 to space the window within the plane of the opening and also provide an additional guiding means therefor.

Prior to assembly of the weatherstrip 38 within the frame member 16, the side walls 42 thereof are spaced apart a greater distance than desired after installation as can be seen in FIGURE 3 so that the walls 42 are biased outwardly toward the ribs 34 and 36 after installation.

In the specific embodiment shown, the weatherstrip 38 is made of a suitable plastic such as polyethylene and the decorative coating of Mylar may be used or otherwise applied to the beaded edges 54 and surfaces 60 of the ribs 52. It will be understood, of course, that the weatherstrip may be made of other materials and that other decorative coatings may be applied thereto or that the coatings may be dispensed with.

It will also be understood that the outer surfaces of the ribs 62 may also be provided with a decorative coating the same as that applied to the ribs 52 or different therefrom as desired.

Thus, this invention provides an improved vehicle body door structure.

We claim:

1. A vehicle body door structure comprising, in combination, a door window frame member including a channel portion provided with a base wall and a pair of side walls, each having a weatherstrip retaining rib provided with a shoulder facing inwardly toward said base wall, and a weatherstrip of generally channel cross section received within said channel portion and including a base wall of less thickness than the distance between said shoulders and channel portion base wall and a pair of side walls, each of said weatherstrip side walls including a deflectable rib extending angularly and outwardly therefrom and being engageable with a respective weatherstrip retaining rib shoulder to retain said weatherstrip within said channel portion, said weatherstrip base wall including a plurality of deflectable ribs extending angularly inwardly therefrom and opposite to said weatherstrip side wall ribs and being engageable with said channel portion base wall to bias said weatherstrip side wall ribs into engagement with said retaining rib shoulders, said weatherstrip side walls each including a second deflectable rib extending inwardly therefrom and defining a panel receiving opening, said second deflectable ribs being engageable with opposite surfaces of a panel slidably received within said weatherstrip.

2. The combination recited in claim 1 wherein said weatherstrip side wall deflectable ribs extend from adjacent juncture of said side walls with said base wall and said weatherstrip side wall second deflectable ribs extend from adjacent the terminus of said weatherstrip side walls.

3. The combination recited in claim 1 wherein said channel portion weatherstrip retaining ribs include a shoulder facing outwardly and said weatherstrip includes third deflectable ribs extending outwardly therefrom adjacent the terminus thereof and overlying said channel portion outwardly facing shoulders.

References Cited by the Examiner
UNITED STATES PATENTS

| | | |
|---|---|---|
| 1,605,006 | 11/1926 | Simpson. |
| 2,203,522 | 6/1940 | Clark. |
| 2,555,952 | 6/1951 | Bailey. |
| 2,840,416 | 6/1958 | Woodward. |
| 3,018,525 | 1/1962 | Deisenroth. |
| 3,131,439 | 5/1964 | Wilfert. |

BENJAMIN HERSH, *Primary Examiner.*

P. GOODMAN, *Assistant Examiner.*